United States Patent [19]
Ceppi

[11] 3,720,555
[45] March 13, 1973

[54] LIGHT POLARIZING DEVICE AND PROCESS FOR MAKING THE SAME

[75] Inventor: Francis G. Ceppi, Arlington, Mass.

[73] Assignee: Polaroid Corporation, Cambridge, Mass.

[22] Filed: May 15, 1970

[21] Appl. No.: 48,649

Related U.S. Application Data

[62] Division of Ser. No. 642,792, June 1, 1967, Pat. No. 3,560,076.

[52] U.S. Cl. ............156/102, 156/196, 156/311
[51] Int. Cl. .................................................B32b 17/10
[58] Field of Search..................156/102, 196, 311

[56] References Cited

UNITED STATES PATENTS

| | | |
|---|---|---|
| 2,470,461 | 5/1949 | Black ..................................156/102 |
| 1,806,861 | 5/1931 | Owen ..............................156/311 X |
| 1,992,976 | 3/1935 | Watkins ...............................156/102 |
| 1,806,846 | 5/1931 | Fox et al..........................156/311 X |
| 2,509,439 | 5/1950 | Langer ............................156/311 X |
| 2,481,189 | 9/1949 | Barnes.............................156/102 X |
| 2,387,308 | 10/1945 | Styll.................................156/102 X |
| 2,263,249 | 11/1941 | Rogers.............................156/102 X |

Primary Examiner—Samuel Feinberg
Assistant Examiner—G. E. Montone
Attorney—Brown and Mikulka, William D. Roberson and James L. Neal

[57] ABSTRACT

This disclosure involves laminated light polarizing devices concave on one side and convex on the other side and a method for press-forming the same.

6 Claims, 8 Drawing Figures

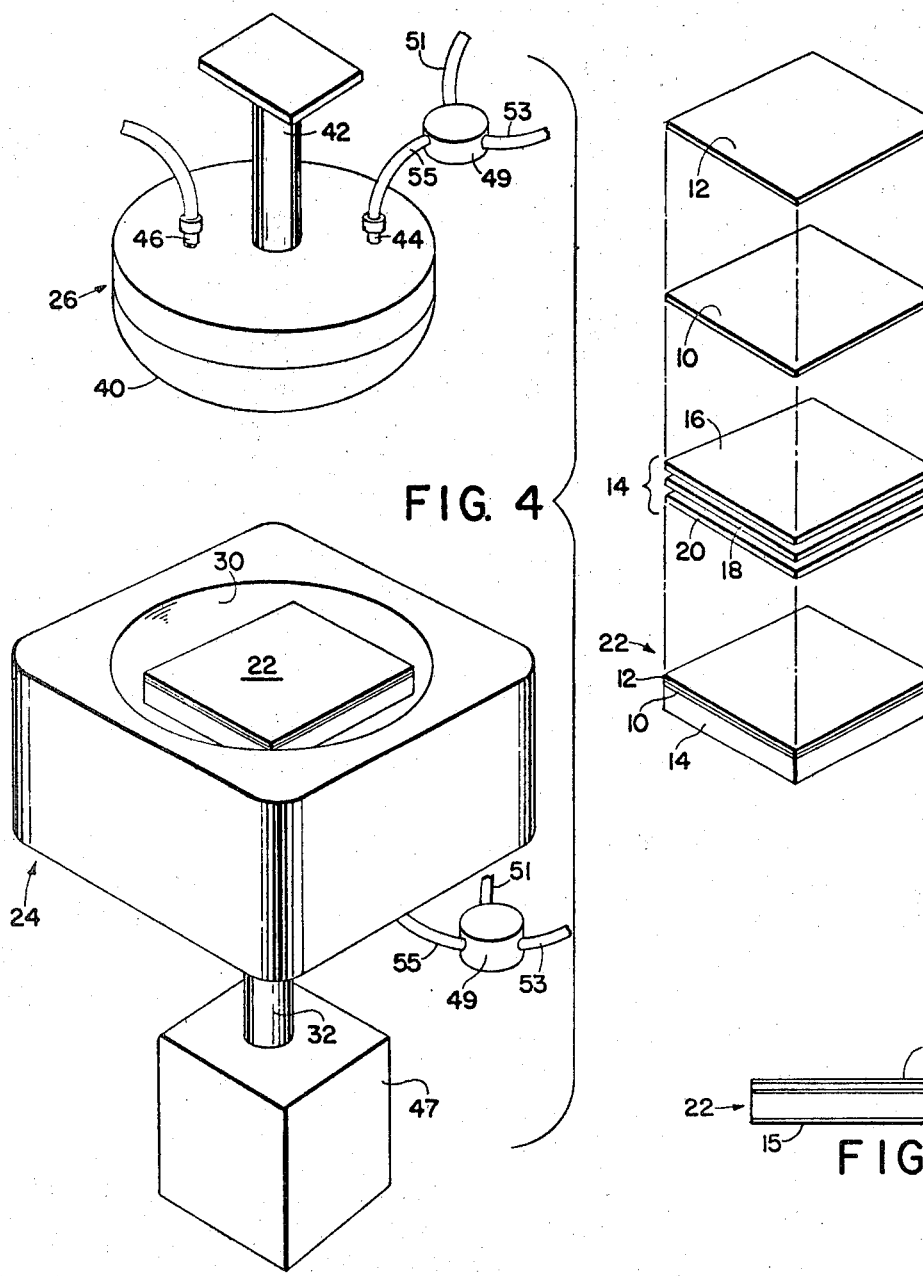

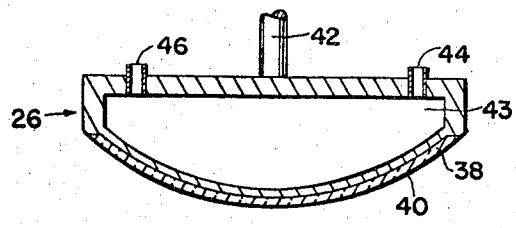
FIG. 5
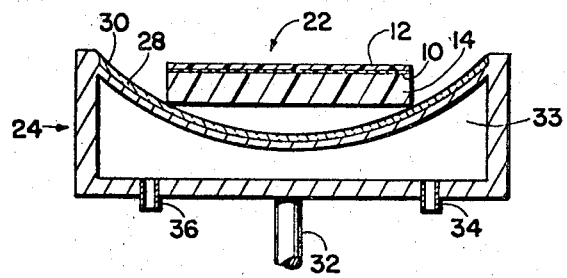
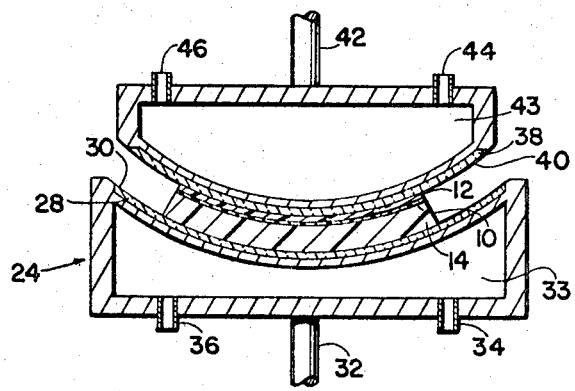
FIG. 6
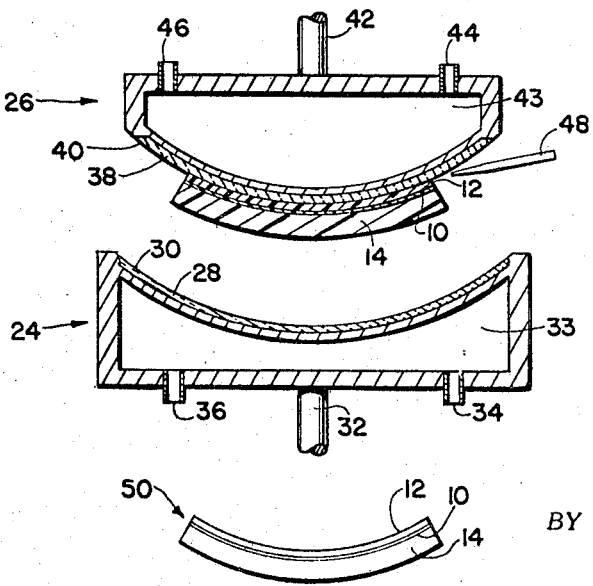
FIG. 7
FIG. 8
INVENTOR.
Francis J. Ceppi
BY Brown and Mikulka
ATTORNEYS

LIGHT POLARIZING DEVICE AND PROCESS FOR MAKING THE SAME

This is a division of copending application Ser. No. 642,792, filed June 1, 1967, now U.S. Pat. No. 3,560,076.

BRIEF SUMMARY OF THE INVENTION

This invention relates to light polarizing devices having a concave side and a convex side and a process for forming the same. The polarizers consist of a laminated structure including a thin optical lamina of light polarizing sheet material located between thermoplastic laminae of unequal thickness.

The optical lamina consists of a material which has been stretched and molecularly oriented to produce birefringence therein and subsequently treated with a stain or dye so that it also includes light polarizing properties. Thermoplastic laminae are applied to opposite sides of the lamina of light polarizing sheet material for support and to protect its surface. The desired curvature is imparted to the laminated structure by a forming operation which involves pressing the laminated structure between cooperating concave and convex platens under heat and pressure.

The light polarizing sheet material is characterized by a substantial inherent stress resulting from the stretch and molecular orientation to which it has been subjected. The subsequent press-forming operation subjects the laminated structure to a stretching action which additionally stretches and stresses the lamina of light polarizing sheet material. The combination of the two stresses in the light polarizing lamina tends to produce microscopic splits therein. When the splits occur in sufficient number, they produce a visible haze in the lamina which reduces the optical quality of the devices below acceptable quality standards. A significant production loss results.

It has been discovered that the magnitude of the stress to which the laminated structure is subjected during formation is maximum in a zone adjacent the concave platen and diminishes to a minimum stress in a zone adjacent the convex platen.

This invention involves a novel construction of the light polarizing device and a novel process for forming it which result in substantial reduction of haze and thereby a substantial increase in the production yield. According to the novel construction, the laminated structure is constructed so that the lamina of light polarizing sheet material is located relatively near one surface of the lamination. This is achieved by arranging the various laminae of the laminated structure so that the lamina of light polarizing material is located between thermoplastic laminae of unequal thicknesses, nearer one surface of the laminated structure than the other. The forming process is carried out by placing the laminated structure in a press, between cooperating concave and convex platens, so that the lamina of light polarizing sheet material is located relatively near the convex platen, in a zone of relatively low stress, and pressing the laminated structure between the platens. Since the light polarizing lamina of the laminated structure is located in a zone of relatively low stress, it is subjected to a minimum tendency to develop splits during the press-forming operation. A substantially increased production yield results.

The additional stress applied to the light polarizing lamina in a laminated structure of the type discussed above during the forming process varies in accordance with a number of dimensionally related variables. Primary among these variables are the radius of curvature to which the laminated structure is formed, the overall thickness of the laminated structure, and the ratio of thickness of the relatively thick thermoplastic lamina to the relatively thin thermoplastic lamina. The aforesaid additional stress increases as progressively smaller radii are used and as laminated structures of progressively greater overall thickness are used. On the other hand, as the ratio of thickness of the relatively thick thermoplastic lamina to the relatively thin thermoplastic lamina increases, the stretch applied to the light polarizing lamina during the forming process may be decreased. This occurs since, as the aforesaid ratio increases, the light polarizing lamina may be located progressively nearer the convex platen, in zones of progressively decreasing stress. In this connection, it should be noted that the relatively thin thermoplastic lamina may be characterized by the minimum thickness which will, in cooperation with the relatively thick thermoplastic lamina, provide both the requisite protection to the light polarizing lamina and the necessary dimensional stability to the laminated structure as a whole. This may be illustrated in connection with light polarizing devices convex on one side and concave on the other formed to a relatively small radius of curvature. These devices must necessarily be constructed of relatively thick laminated structures to provide adequate rigidity and shape retention characteristics. Since this construction combines both the above mentioned stress-producing conditions, there is a large amount of haze produced during its formation. The advantage obtained from the process of the present invention is therefore essential to the production of such light polarizing devices. When the process is employed, haze is, in some applications, eliminated and in others, reduced to a level at which it is not objectionable.

It is an object of this invention to provide a laminated light polarizing device convex on one side and concave on the other side which includes a stressed and molecularly oriented lamina free from haze-producing splits.

It is also an object of this invention to provide a process capable of producing large numbers of light polarizing devices concave on one side and convex on the other wherein each device includes a stressed and molecularly oriented lamina substantially free of haze-producing splits.

FIG. 1 is a perspective view of the lamina from which one embodiment of the light polarizing device of this invention may be constructed;

FIG. 2 is a perspective showing of a laminated structure comprising the laminae of FIG. 1;

FIG. 3 is a cross-sectional view of another embodiment of the light polarizing device of this invention;

FIG. 4 is a perspective view of one type of press-forming apparatus which is suitable for performing the process of this invention;

FIG. 5 is a cross-sectional view of the apparatus of FIG. 3 showing one step in the process of this invention;

FIG. 6 is a cross-sectional view of the apparatus of FIG. 3 showing another step in the process of this invention;

FIG. 7 is a cross-sectional view of the apparatus of FIG. 3 showing a further step in the process of this invention; and FIG. 8 is a side elevation of the completed light polarizing device of this invention.

DETAILED DESCRIPTION OF THE DRAWINGS

Reference is now made to FIG. 1 showing laminae forming a laminated structure from which one embodiment of the light polarizing device of this invention is formed.

Lamina 10 is stretched, oriented and dyed light-polarizing material which may, for example, by molecularly oriented polyvinyl alcohol treated with an iodine stain. Light polarizers of the type described are disclosed in U.S. Pats. Nos. 2,237,567; 2,527,400; and 2,554,850.

Laminae 12 and 14 each comprise one or more sheets of thermoplastic material. In the embodiment herein shown and described, lamina 12 consists of a single sheet and lamina 14 consists of a combination of three sheets 16, 18 and 20, each of which is substantially the same thickness as lamina 12. The laminated structure is produced, as shown in FIG. 1 by arranging laminae 12 and 14 on opposite sides of lamina 10 and adhesively securing the laminae to each other. The laminated structure 22 is shown in FIG. 2. Lamina 12, and sheets 16, 18 and 20 comprising lamina 14 may be of the same or of a different thermoplastic material and may, for example, be a thermoplastic cellulose derivative, e.g. cellulose nitrate, cellulose triacetate, cellulose acetate propionate, cellulose acetate butyrate, ethyl cellulose, etc. Plastic lamination including materials of this description are disclosed in U.S. Pats. Nos. 2,527,400 and 3,097,106.

The laminated structure may be produced by a suitable method, either prior to the forming operation to be subsequently described or during the forming operation. According to the preferred forming process, laminated structure 22 is produced prior to the forming process, laminated structure 22 is produced prior to the forming operation. Lamina 12 is located adjacent one side of lamina 10 and bonded thereto with a suitable solvent based adhesive. Sheet 16 of lamina 14 is bonded to the opposite side of lamina 10 with a suitable solvent based adhesive and sheets 18 and 20 are bonded to each other and to sheet 16 with an adhesive, such as one consisting of 75 percent ethyl acetate and 25 percent of methanol by volume. As shown in FIG. 3, an abrasive-resistant coating 15 may be applied to exposed surfaces of laminae 12 and 14 and may, for example, be a completely polymerized melamineformaldehyde resin, a thermosetting, cross-linked polymer such as a diethylenic-substituted polyalkyleneglycol, e.g. polymeric coatings formed by in situ polymerization of polyalkyleneglycol diesters of $\alpha$-$\beta$-unsaturated carboxylic acids on the plastic sheet material, etc. Plastic laminations including coatings of this description are disclosed in U.S. Pats. Nos. 2,527,400; 3,081,192; and 3,097,106.

The light polarizing device of this invention may embody a light polarizing blank from which a curved sunglass lens is formed. In one such embodiment, lamina 10 is produced from a 0.0015 inch thick sheet of polyvinyl alcohol which has been stretched unidirectionally to a thickness of 0.0005 inch to achieve molecular orientation and dyed, with an iodine-containing dye. Lamina 12 consists of a single sheet of transparent cellulose alcohol butyrate 0.0135 inch in thickness including a grey dye which absorbs a portion of the light incident thereon and transmits the remaining portion. Lamina 14 consists of three sheets of transparent cellulose acetate butyrate each of which is 0.0135 inch in thickness wherein sheet 16, adjacent lamina 10, includes a grey dye identical to that in lamina 12. The formed sunglass lens may be periphially trimmed to a shape suitable for any desired sunglass frame.

The process by which the light polarizing lamination of this invention is formed into a light polarizing device concave on one side and convex on the other side will be described below in connection with FIGS. 4 through 7.

The forming process may be carried out by apparatus of the type shown in FIG. 4. The apparatus includes concave platen 24, convex platen 26, means for driving the platens into and out of pressure-applying relationship with each other, and means for alternately heating and cooling the platens during each pressure-applying interval.

concave platen 24 includes glass member 28 having smooth concave forming surface 30, shaft 32 operatively connected to a suitable drive means, fluid chamber 33, fluid inlet coupling 34, and fluid outlet coupling 36.

Convex platen 26 includes glass member 38 having convex forming surface 40, fixed support means 42, fluid chamber 43, fluid inlet coupling 44, and fluid outlet coupling 46.

The drive means includes a suitable hydraulic piston and cylinder arrangement 47 operatively connected to platen 24 for moving platen 24 into and out of pressure-applying relationship with platen 26.

The heating and cooling means for both the platens includes three-way valve means 49, heating fluid conduit 51, cooling fluid conduit 53, and fluid inlet 55 connecting one of the three-way valves to each of fluid inlet couplings 34 and 44 of platens 24 and 26 respectively.

Referring now to FIG. 5, laminated structure 22 is placed in concave platen 24 so that relatively thin lamina 12 faces convex platen 26, thereby locating the light polarizing lamina relatively near the convex platen. The concave and convex platens are then moved into pressure applying relationship, as shown in FIG. 6, to form the laminated structure into a shape characterized by a concave surface and a convex surface. While pressure is being applied to the laminated structure, the platens are heated by passing hot water through chambers 33 and 43 of platens 24 and 26, respectively. Surfaces 30 and 40 are continually heated until the temperature reaches a maximum, for example, 280° F. This temperature is maintained for a period of time sufficiently long to allow the desired formation to occur, after which the temperature of surfaces 30 and 40 is reduced by passage of a cooling fluid, such as relatively cool water, through chambers 33 and 43 of the platens. The hot water is supplied to the platens through conduits 51 and the relatively cool water is supplied through conduits 53. During the heating cycle valves 49 open a connecting passage between conduit 51 and inlet 55 and closes conduit 53; oppositely, during the cooling cycle, the valve opens a connecting passage between conduit 53 and inlet 55 and closes conduit 51. The transition from the heating cycle to the cooling cycle is carried out by operating valves 49 to mix cool water with the hot water until the hot water is completely displaced by cool water. Transition from cooling cycle to heating is carried out by reversing the operation. After the cooling operation, platens 24 and 26 are separated to relieve the pressure on laminated structure 22 and permit its removal, as shown in FIG. 7. The laminated structure may adhere to one of the platens, from which it may be removed by a stream of compressed air supplied by air nozzle 48.

FIG. 8 illustrates a formed light polarizing device, 50, concave on the side formed by convex platen 26 and convex on the side formed by concave platen 24.

Light polarizing devices may be produced by the above process from laminated structure in a variety of over all thicknesses, varying in the ratio of thickness of lamina 14 to lamina 12 and in radius of curvature.

Laminated structure having a thickness ratio of lamina 14 to lamina 12 of one and one-half to one (1.5:1) yield a substantial amount of haze-free production in practically all cases. Various illustrative examples follow. It has been shown that structures having an overall thickness ranging up to 0.045 inch and a thickness ratio of thermoplastic lamina 14 to thermoplastic lamina 12 which equals or exceeds (2:1) can be formed with a radius of curvature as small as 2.319 inches with no evidence of haze formation. Structures having an overall thickness ranging up to 0.057 inch and a thickness ratio of lamina 14 to lamina 12 which equals or exceeds (3:1) have been formed with a radius as small as 3.476 inches with no evidence of haze formation and with a radius as small as 2.319 inches with substantially no haze formation. Further, in forming devices to a radius of curvature of substantially 2.319 inches, 0.057 inch thick laminated structures having a thermoplastic laminae ratio of (3:1) show significantly less haze formation than do 0.030 inch laminated structures having thermoplastic laminae of equal thickness. Similarly, in forming devices to a radius of substantially 1.8 inches, laminated structures having a thickness of 0.057 inch and a thermoplastic lamina ratio of (3:1) will be characterized by a greater resistance to haze formation than somewhat thinner structures having thermoplastic laminae of equal thickness.

When a laminated structure having thermoplastic laminae of unequal thicknesses is located between concave and convex platens with the lamina of light polarizing material relatively near the convex platen and press-formed according to this invention, the incidence of haze is substantially eliminated, as discussed above. On the other hand, if the same laminated structure were located between the same platens with the lamina of light polarizing material near the concave platen and press-formed, a very large quantity of haze producing splits would result. It is concluded that as the ratio of the relatively thick thermoplastic lamina to the relatively thin thermoplastic lamina of the laminated structure increases, the incidence of haze decreases when the laminated structures are press-formed with the light polarizing lamina closely adjacent the convex platen and increases when the laminated structures are press-formed with the light polarizing lamina closely adjacent the concave platen.

While in the preferred embodiments discussed above, the radii of curvature of both the concave and convex faces of a formed light polarizing device are taken as equal, it should be understood that the invention includes within its scope devices having concave and convex surfaces of unequal radii of curvature.

The light polarizing device of this invention is not limited to those constructed from the particular laminated structure herein described but includes those wherein circular and elliptical light polarizing sheets are used in the laminated structure, or those including any other sheet of material in which optical properties are produced by a stretching operation; other suitable supporting laminae may be used. It should also be understood that the process of this invention may be carried out not only by press-forming apparatus of the type described herein but by any suitable apparatus.

Since certain changes may be made in the above product and process without departing from the scope of the invention herein involved, it is intended that all matter contained in the above description or shown in the accompanying drawings shall be interpreted as illustrative and not in a limiting sense.

I claim:

1. The process of forming a light polarizing device comprising the steps of:
    a. arranging a bonded lamination having synthetic thermoplastic laminae of unequal thickness disposed upon opposite sides of a stretched thin lamina of light polarizing material in a press between concave and convex platens with the relatively thin synthetic thermoplastic lamina adjacent said convex platen; and
    b. pressing said bonded lamination between said concave and convex platens.

2. A process according to claim 1 further comprising the steps of:
    a. heating said bonded lamination while it is pressed between said concave and convex platens;
    b. cooling said bonded lamination while it is pressed between said platens;
    c. relieving the pressure exerted upon said bonded lamination by said platens; and
    d. removing said bonded lamination from between said platens, to thereby produce a light polarizing device having a concave surface and a convex surface.

3. A process according to claim 1 wherein the thickness of the relatively thick lamina of said synthetic thermoplastic laminae equals or exceeds one and one-half times the thickness of the relatively thin thermoplastic lamina.

4. The process of forming a plastic lens comprising the steps of:
    a. laminating synthetic thermoplastic laminae of unequal thickness on opposite sides of a stretched, thin lamina of light polarizing material to form a composite lens blank;
    b. locating said composite lens blank between concave and convex platens with the thinner one of said synthetic thermoplastic laminae facing the convex platen; and
    c. pressing said lens blank between said concave and convex platens.

5. A process according to claim 4 further comprising the steps of:
   a. heating said lens blank while it is pressed between said concave and convex platens;
   b. cooling said lens blank while it is pressed between said platens;
   c. relieving the pressure exerted upon said lens blank by said platens; and
   d. removing said lens blank from between said platens, to thereby produce a light polarizing plastic lens having a concave surface and a convex surface.

6. The process of forming a light polarizing device comprising the steps of:
   a. laminating a first lamina of cellulose acetate butyrate and a second lamina of cellulose acetate butyrate which equals or exceeds 1.5 times the thickness of said first cellulose acetate butyrate lamina on opposite sides of a light polarizing lamina of stretched, molecularly oriented polyvinyl alcohol stained with iodine, to form a composite laminated structure;
   b. locating said composite laminated structure between convex and concave platens with said first cellulose acetate butyrate lamina facing the convex platen;
   c. pressing said laminated structure between said concave and convex platens;
   d. heating said laminated structure while it is pressed between said concave and convex platen;
   e. cooling said laminated structure while it is pressed between said platens;
   f. relieving the pressure exerted upon said laminated structure by said platens; and
   g. removing said laminated structure from between said platens to thereby produce a light polarizing device having a concave surface and convex surface.

* * * * *